March 14, 1944.  B. D. MAULE  2,344,157

TAIL WHEEL MOUNTING

Filed Nov. 14, 1940

Inventor
BELFORD D. MAULE
By Beaman & Langford
Attorneys

Patented Mar. 14, 1944

2,344,157

UNITED STATES PATENT OFFICE 2,344,157

TAIL WHEEL MOUNTING

Belford D. Maule, Jackson, Mich.

Application November 14, 1940, Serial No. 365,585

6 Claims. (Cl. 244—50)

The present invention relates to improvements in caster type wheels for vehicles and more particularly to such wheels for airplanes, steerable by coordination with the rudder mechanism.

In tail wheels for airplanes, there have been provided structures which operate to positively steer the wheel through a limited predetermined arc and which permit full swiveling action when an attempt is made to turn the wheel beyond the limits of the predetermined arc. These structures, however, are not entirely satisfactory due to the complicated arrangement of parts employed. The present invention simplifies the prior art constructions by reducing the number of parts required, thereby cheapening the construction without reducing its efficiency.

An object of the invention is to provide a tail wheel assembly arranged for positive steering through a predetermined arc and free swiveling when the steering mechanism is moved to turn the wheel beyond the predetermined arc.

Another object of the invention is to provide a tail wheel assembly with a steering arm supporting a locking pin, which over a predetermined arc of rotational movement of the wheel, locks the steering arm to the wheel and which beyond the predetermined arc moves to unlock the arm from the wheel.

Still another object of the invention is to provide a tail wheel assembly having a steering arm in which is supported a locking pin for locking the wheel and steering arm together, and a camming surface on the outside of the wheel supporting bracket for moving said locking pin to unlocking position under predetermined conditions.

Figure 2:
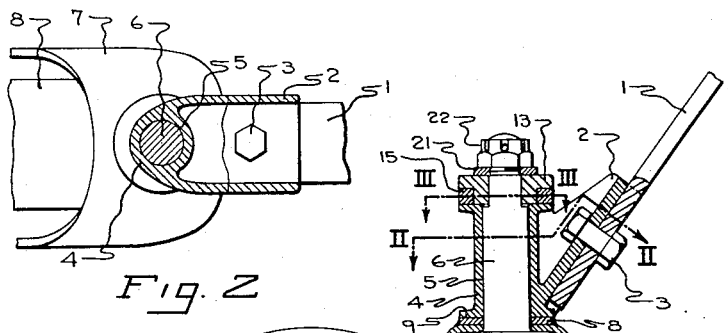
Figure 5:
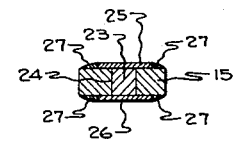
Figure 1:
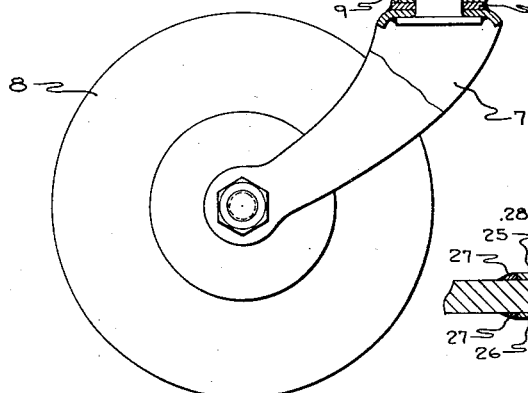
Figure 4:
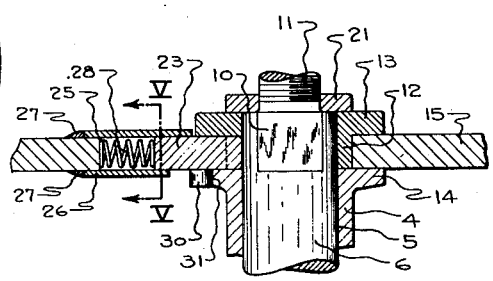
Figure 3:
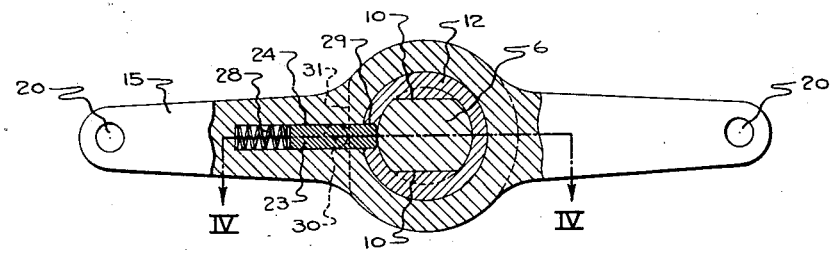
Figure 6:
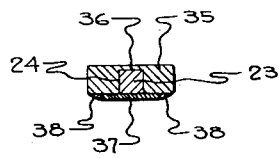

These and other objects residing in the construction, arrangement and combination of the parts will be apparent from the following specification when taken with the accompanying drawing, in which:

Fig. 1 is an elevation of a tail wheel according to the present invention, partly in section, disclosing the invention, Fig. 2 is a section on the line II—II of Fig. 1, Fig. 3 is a section on the line III—III of Fig. 1 enlarged to show details, Fig. 4 is a section on the line IV—IV of Fig. 3, Fig. 5 is a section on the line V—V of Fig. 4, and Fig. 6 is a section corresponding to Fig. 5, showing an alternative form of construction of a detail.

Referring particularly to the drawing, the reference character 1 indicates a portion of the fuselage of an airplane to which a bracket 2 is connected by a bolt 3. The bracket 2 is provided with a housing portion 4, having a central bore 5 in which is pivotally mounted a post 6, rigidly secured to the forks 7, mounting a tail wheel 8. Welded to the top of the forks 7 is a flat member 3 having a bearing surface for contacting with the lower surface 9 of the bracket housing 4.

The post 6 projects above the top of the bracket housing 4 as shown particularly in Fig. 4 and the portion of the post 6 above the bracket housing 4 is provided with flat sides 10. Above the flat sides 10, the post 6 is provided with a threaded portion 11. Disposed over the portion of the post 6 having the flat sides 10, is a sleeve 12 having an annular radially extending flange 13 spaced vertically from a radially extending flange 14 provided at the top of the bracket housing 4. The sleeve 12 is provided with an internal opening therein conforming to the configuration of the portion of the post 6 having the flat sides 10 so that it will rotate with the post 6. Disposed between the flanges 13 and 14 is a steering arm 15, shown more particularly in Fig. 3. The arm 15 is provided at its ends with openings 20 by means of which a suitable connection may be made with the rudder steering mechanism of the airplane with which the wheel structure is associated and which is not shown. Disposed over the sleeve 12 is a washer 21 and on the threaded portion 11 on the post 6 is a nut 22 for maintaining the parts in assembled relation.

For locking the steering arm 15 to the post 6 for steering the tail wheel 8, the steering arm is provided with a pin 23. The pin 23 is disposed in a slot 24 in one side of the steering arm 15 and is held therein by plates 25 and 26, the plates being connected to the steering arm 15 by solder 27. Disposed within the slot 24 outwardly of the pin 23, is a spring 28, which resiliently urges the pin 23 inwardly into a slot or notch 29 in the sleeve 12.

The pin 23 is provided with a depending cam follower 30, shown particularly in Figs. 3 and 4. The follower 30 is normally urged against the periphery of the flange 14 by the spring 28. However, in order to permit the pin 23 to take a position in the slot 29 in the sleeve 12, a segment of the flange 14 is removed to provide a surface 31, the resulting periphery of the flange 14 constituting a camming surface, shown in Figs. 3 and 4.

In operation with the parts in the position disclosed in the drawing, oscillation of the steering arm 15 will result in a corresponding oscillation of the post 6 and through it the tail wheel 8, due to the fact that the steering arm 15 is locked to the post 6 as the result of the pin 23 being positioned in the slot 29 of the sleeve 12, which is in turn arranged for rotation with the pin 6 by virtue of the flat sides 10 thereof. It will be evident, however, that should the pin 23 be removed from the slot 29 in the sleeve 12, the tail wheel 8 will be free to swivel throughout a full 360°.

When maneuvering airplanes on the ground and particularly when manually moving them in hangers, it is desirable to have a free swiveling tail wheel. This result is obtained according to the present invention when the steering arm 15 is oscillated through a sufficient arc to cause the follower 30 to ride along the surface 31 and the periphery of the flange 14 to axially move the pin 23 outwardly until it is disengaged from the slot 29. From Fig. 3 it will be clear that upon a predetermined rotation of the arm 15 in either direction, the pin 23 will be disengaged from the slot 29 to permit free swiveling of the wheel 8. The length and shape of the surface 31 may be designed so as to provide operative engagement of the pin 23 with the slot 29, and thus positive steering of the tail wheel 8, throughout any desired arc of movement of the arm 15.

In Fig. 6 there is disclosed another form of the invention wherein the steering arm 35, corresponding to the arm 15, is provided with a slot 36 extending inwardly from one side thereof, but longitudinally in the same manner as the slot 24. The pin 23 is disposed in the slot 36 and maintained therein by a plate 37 secured to the underside of the arm 35 by solder 38. In this form of the invention the arm 35 will be thicker than the arm 15, or the pin 23 will be thinner than when used in the construction shown in Figs. 3, 4 and 5.

From the foregoing description, it will be apparent that the construction of my invention is simple and compact. Should it be desired to dispense with the limited arc positive steering feature, it is necessary only to eliminate the pin 23 or to substitute for the sleeve 12 a sleeve without a slot 29. These changes may be made either by the manufacturer, should he desire to furnish full swiveling tail wheel assemblies in addition to limited arc positive steering tail wheels, or they may be made by a purchaser who desires to change the tail wheel assembly from limited arc positive steering to full swiveling.

Having thus described my invention, what I desire to secure and claim by Letters Patent is:

1. In a steerable full caster tail wheel assembly, a completely rotatable part about the axis of which the tail wheel swings, a bracket from which said rotatable part is supported for said swinging movement, an oscillatable part adapted to be oscillated by steering mechanism, means carried by said oscillated part for locking said parts together, a radially extending annular flange about said bracket, the periphery of said flange constituting a cam, a follower operatively connected to said locking means, and means for resiliently urging said locking means into locking engagement with said rotatable part and for continuously urging said follower into operative engagement with said cam, said cam being arranged so as to disengage said locking means from locking engagement with said rotatable part when said oscillatable part oscillates past predetermined limits.

2. In a steerable full caster tail wheel assembly, wheel supporting means, a steering post fixed with respect to said wheel supporting means, a bracket in which said steering post is rotatably mounted for full rotary movement, said post extending through said bracket, an annular radially extending flange about said bracket adjacent the part thereof from which said post projects, said flange having an annular surface normal to the axis of said post, a steering arm adapted to be oscillated by steering mechanism, said steering arm having a central opening, said steering arm resting on said annular surface of said flange and said post extending through said opening, a pin supported by said arm for reciprocatory motion in a direction substantially normal to the axis of said post, an annular member having a slot therein secured to said pin for rotation therewith, said pin being movable into said slot for locking said arm and post together for simultaneous oscillatory movement, a follower carried by said pin, a cam fixed with respect to said bracket, and means for resiliently urging said pin into said slot and for continuously urging said follower into operative engagement with said cam, said cam being arranged so as to disengage said pin from locking engagement with said slot when said arm oscillates past predetermined limits.

3. In a steerable full caster tail wheel assembly, a completely rotatable part about the axis of which said tail wheel swings, a bracket in which a portion of said rotatable part, concentric with the axis thereof, is supported for mounting said rotatable part for said swinging movement, said portion extending through said bracket, an annular radially extending flange about said bracket adjacent the part thereof from which said portion projects, said flange having an annular surface substantially normal to the axis of said portion, a steering arm adapted to be oscillated by steering mechanism, said steering arm having a central opening, said steering arm resting on said annular surface of said flange, and said portion extending through said opening, a pin supported by said arm for reciprocatory motion in a direction substantially normal to the axis of said portion, said projecting part of said portion having a slot, said pin being movable into said slot for locking said arm and portion together for simultaneous oscillatory movement, a follower carried by said pin, a cam fixed with respect to said bracket, and means for resiliently urging said pin into said slot and for continuously urging said follower into operative engagement with said cam, said cam being arranged so as to disengage said pin from locking engagement with said slot when said arm oscillates past predetermined limits.

4. In a steerable full caster tail wheel assembly, a completely rotatable part about the axis of which said tail wheel swings, a bracket in which a portion of said rotatable part, concentric with the axis thereof, is supported for mounting said rotatable part for said swinging movement, said portion extending through said bracket, an annular radially extending flange about said bracket adjacent the part thereof from which said portion projects, said flange having an annular surface substantially normal to the axis of said portion, a steering arm adapted to be oscillated by steering mechanism, said steering arm having a central opening, said steering arm resting on said annular surface of said flange, and said portion extending through said opening, said arm having a slot therein, a pin disposed in said slot for reciprocatory movement in a direction substantially normal to the axis of said portion, the projecting part of said portion having a slot, said pin being movable into said slot for locking said arm and post together for simultaneous oscillatory movement, a follower member carried by said pin, a cam fixed with respect to said bracket, and a spring in said slot for resiliently urging said pin into said slot and for continuously urging said follower into operative engagement with said cam, said cam being arranged so as to disengage said pin from locking engagement with said slot when said arm oscillates past predetermined limits.

5. In a steerable full caster tail wheel assembly, a completely rotatable part about the axis of which said tail wheel swings, a bracket in which a portion of said rotatable part, concentric with said axis, is supported for mounting said rotatable part for said swinging movement, said portion extending through said bracket, an annular radially extending flange about said bracket adjacent the part thereof from which said portion projects, said flange having an annular surface substantially normal to the axis of said portion, a steering arm adapted to be oscillated by steering mechanism, said steering arm having a central opening, said steering arm resting on said annular surface of said flange, and said portion extending through said opening, said arm having a slot therein, a pin disposed in said slot for reciprocatory movement in a direction substantially normal to the axis of said portion, the projecting part of said portion having a slot, said pin being movable into said second named slot for locking said arm and post together for simultaneous oscillatory movement, a follower member carried by said pin, the periphery of said flange constituting a cam, and means for resiliently urging said pin into said second named slot and for continuously urging said follower into operative engagement with said cam, said cam being arranged so as to disengage said pin from locking engagement with said second named slot when said arm oscillates past predetermined limits.

6. In a steerable full caster tail wheel assembly, a completely rotatable part about the axis of which said tail wheel swings, a bracket in which a portion of said rotatable part, concentric with the axis thereof, is supported for mounting said rotatable part for said swinging movement, said portion extending through said bracket, an annular seating surface on said bracket adjacent the part thereof from which said portion projects, said surface being substantially normal to the axis of said portion, a steering arm adapted to be oscillated by steering mechanism, said steering arm having a central opening, said steering arm resting on said annular surface, and said portion extending through said opening, said arm having a slot therein, a pin disposed in said slot for reciprocatory movement in a direction substantially normal to the axis of said portion, the projecting part of said portion having a slot, said pin being movable into said slot for locking said arm and post together for simultaneous oscillatory movement, a follower member carried by said pin, a cam fixed with respect to said bracket, and a spring in said slot for resiliently urging said pin into said slot and for continuously urging said follower into operative engagement with said cam, said cam being arranged so as to disengage said pin from locking engagement with said slot when said arm oscillates past predetermined limits.

BELFORD D. MAULE.